United States Patent Office 2,846,484
Patented Aug. 5, 1958

2,846,484

PRODUCTION OF CHLORINATED ALIPHATIC COMPOUNDS

John E. Fox, Texas City, Tex., assignor to Monsanto Chemical Company, St. Louis, Mo., a corporation of Delaware No Drawing. Application February 2, 1954
Serial No. 407,820

1 Claim. (Cl. 260—658)

This invention relates to the manufacture of certain saturated chlorinated hydrocarbons and, more particularly, it pertains to the preparation of higher chlorinated ethanes by the reaction of oxygen, hydrochloric acid, and dichloroethane.

It is an object of this invention to provide an improved method for the preparation of saturated aliphatic halides.

It is a further object of the invention to provide a method for the preparation of tetrachloroethane wherein dichloroethane, oxygen and hydrogen chloride are utilized as raw materials.

It is another object of the invention to provide an improved method for the chlorination of dichloroethane wherein tetrachloroethane is the predominating product to the substantial exclusion of higher chlorinated products.

Other objects and advantages of the invention will become apparent from the following detailed description thereof.

In a copending application, Serial No. 404,767, filed January 18, 1954, there is described a process for reacting dichloroethane with hydrogen chloride and oxygen in the presence of an oxidation catalyst at a temperature from 250° to 600° C. to produce higher chlorinated ethanes in good yield. The present invention is based on the discovery that bromine, when present during the above reaction, serves to promote the reaction and results in a significantly higher conversion of dichloroethane to higher chlorinated products.

The reaction may be carried out by mixing dichloroethane and hydrogen chloride with oxygen or air and passing the mixture over the catalyst in a heated reaction chamber. If desired, the three reactants may be introduced into the reactor in separate streams, or the air or oxygen may be introduced into the mixture of dichloroethane and hydrogen chloride. However, because of the explosive limits of dichloroethane, this reactant and oxygen or air should not be permitted to reach reaction temperature in the absence of the hydrogen chloride.

The bromine may be added with the hydrochloric acid or anhydrous hydrogen chloride feed to the reactor. Only small quantities are required. Amounts from as little as 0.1% of bromine by weight of the anhydrous hydrogen chloride fed are generally satisfactory. However, optimum results are achieved when the amount of bromine used is in the range from 0.5 to 1% by weight of the anhydrous hydrogen chloride used in the reaction.

The products of the reaction may be recovered by condensation of the gases leaving the reaction chamber. This is effected by means of suitable refrigeration, compression, a combination of compression and cooling, or other well known methods. The crude product is readily separated from unconverted dichloroethane by frictional distillation after neutralization of any free acid present.

The following examples will illustrate the principle of the invention.

Example I

A preheater-reactor constructed of 1-in. diameter glass tubing encased in a jacket of 2-in. glass pipe over all of its 6-ft. length was employed in the experiments. A heat transfer agent such as that known to the trade as "Aroclor," for example, was heated to the desired temperature and continuously circulated through the jacket. The lower 27 inches of the tube was packed with catalyst while the rest of the tube was packed with glass helices. The catalyst was prepared by impregnating 4–8 mesh alumina with a solution of salts in the following approximate proportions by weight:

| | Percent |
|---|---|
| $CuCl_2 \cdot 2H_2O$ | 79.5 |
| $CoCl_2 \cdot 6H_2O$ | 15.8 |
| $FeCl_3 \cdot 6H_2O$ | 4.7 |

The deposited salts, after drying, represented about 18% of the total weight of the catalyst.

The reactants were fed into the top section of the reactor where they were preheated to the temperature of the circulating heat medium maintained at about 342° C. and thence through the catalyst bed. Feed rates at standard conditions were as follows:

Aqueous HCl—3 ml./min.=688 ml./min. anhydrous gas
Liquid 1,2-dichloroethane—1.2 ml./min.=344 ml./min. gas
Air—1800 ml./min.

Reaction product leaving the bottom of the reactor was condensed by means of cold traps. The organic layer was washed with water, dried, and fractionally distilled to yield the following products:

| | Wt. percent |
|---|---|
| Unreacted dichloroethane | 49.3 |
| Tetrachloroethane | 38.1 |
| Trichloroethane | 12.6 |
| Total | 100.0 |

Conversion of dichloroethane to higher chlorinated products in this case was 39.2%.

Example II

The experiment of Example I was repeated except that an amount of bromine equivalent to approximately 0.5% by weight of the anhydrous hydrogen chloride fed to the reaction was added with the hydrochloric acid feed. Flow rates, hence, ratio of reactants, were the same, as was the temperature employed, as those in Example I.

Upon fractionation, the organic reaction product yielded the following analysis:

| | Wt. percent |
|---|---|
| Unreacted dichloroethane | 26.9 |
| Tetrachloroethane | 55.1 |
| Trichloroethane | 18.0 |

Based on dichloroethane recovered, 63.1% of the starting dichloroethane was converted to higher chlorinated ethanes in this case.

The invention is not limited to the specific embodiment presented in the examples given. Some variations in procedure may be made without departing from the scope of the invention. Either aqueous hydrochloric acid or anhydrous hydrogen chloride may be employed. Because of the exothermic nature of the reaction, aqueous hydrochloric acid is preferred because of the heat capacity of the accompanying water which facilitates maintenance of the desired temperature in the reactor.

Molecular equivalents of the reactants as represented in the equation for the reaction given below are employed. Thus, as indicated $$C_2H_4Cl_2 + 2HCl + O_2 \rightarrow C_2H_2Cl_4 + 2H_2O$$

two moles of hydrogen chloride and one mole of oxygen are required for the conversion of one mole of dichloroethane to tetrachloroethane. A slight excess of oxygen

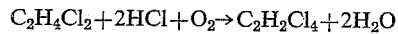

or air is desirable. Small excesses of either or both of the other reactants, not exceeding 10%, do not adversely affect the reaction. However, no advantages are attained by the use of these reactants in excess. Unreacted dichloroethane may be readily recycled in the process and thereby excellent yields may be obtained.

The use of an oxidation catalyst is essential in order to obtain good yields of tetrachloroethane. Generally, all of the oxidation catalysts known in the art are effective, to some degree, for promoting the reaction. To be preferred, however, are the oxides or salts of copper, iron, and bismuth. In general, best results are obtained by the use of a copper catalyst which may be in the metallic state or as copper oxide or a copper salt such as the chloride, for example. Preferably the catalysts are deposited on refractory supports such as pumice, silica gel, alumina gel, procelain or the like. An eminently suitable catalyst for the reaction and one with which excellent results have been secured is a mixture of copper chloride, cobalt chloride, and ferric chloride deposited on alumina. Another excellent catalyst is prepared by coprecipitating copper and aluminum hydroxides from solutions of copper and aluminum chlorides, drying the precipitate, breaking up the dried filter cake, and screening the particles to secure preferably a 4–8 mesh size.

What is claimed is:

A process which comprises reacting two moles of hydrogen chloride and one mole of oxygen with one mole of dichloroethane in the presence of a catalyst which is a mixture of copper chloride, cobalt chloride and ferric chloride deposited on alumina and as a promoter an amount of bromine within the range from about 0.1% to about 1% by weight of the anhydrous hydrogen chloride fed at a temperature from about 300° C. to about 450° C.

References Cited in the file of this patent

UNITED STATES PATENTS

| | | |
|---|---|---|
| 1,654,821 | Krause et al. | Jan. 3, 1928 |
| 1,841,279 | Dow | Jan. 12, 1932 |
| 1,963,761 | Prahl | June 19, 1934 |
| 2,374,923 | Cass | May 1, 1945 |
| 2,379,414 | Cass | July 3, 1945 |
| 2,399,488 | Hearne | Apr. 30, 1946 |

FOREIGN PATENTS

| | | |
|---|---|---|
| 108,421 | Austria | Dec. 27, 1927 |

OTHER REFERENCES

Groggins: Unit Processes in Organic Synthesis, 4th ed., McGraw-Hill (1952), pages 176–177.